US 6,810,863 B2

(12) United States Patent
Memmott et al.

(10) Patent No.: US 6,810,863 B2
(45) Date of Patent: Nov. 2, 2004

(54) GASEOUS FUEL AND AIR MIXER ASSEMBLY FOR INTERNAL COMBUSTION ENGINE

(75) Inventors: Bryan Memmott, North Barrington, IL (US); Mark A. Fisher, Crystal Lake, IL (US); Jerry D. Hielkema, Rockton, IL (US)

(73) Assignee: Woodward Governor Company, Fort Collins, CO (US)

( * ) Notice: Subject to any disclaimer, the term of this patent is extended or adjusted under 35 U.S.C. 154(b) by 0 days.

(21) Appl. No.: 10/698,270

(22) Filed: Oct. 31, 2003

(65) Prior Publication Data
US 2004/0089276 A1 May 13, 2004

Related U.S. Application Data

(60) Provisional application No. 60/423,170, filed on Nov. 1, 2002.

(51) Int. Cl.[7] ................................ F02B 43/00
(52) U.S. Cl. ...................... 123/527; 123/590
(58) Field of Search ................ 123/527, 590; 48/180.1

(56) References Cited

U.S. PATENT DOCUMENTS

| 2,927,848 | A | | 3/1960 | Baverstock |
| 3,810,606 | A | | 5/1974 | Masaki |
| 3,948,489 | A | | 4/1976 | Sawyer |
| 5,245,977 | A | * | 9/1993 | Chen et al. ............... 123/590 |

* cited by examiner

*Primary Examiner*—Noah P. Kamen
(74) *Attorney, Agent, or Firm*—Leydig, Voit & Meyer Ltd.

(57) ABSTRACT

A gas/air mixer assembly provides a Venturi metering system that may draw fuel from a zero governor, mix it with air to form a homogenous gas/air mixture for delivery to an internal combustion engine. The gas/air mixer assembly may also accept fuel under pressure from a gas metering valve or fuel injector for delivery to an internal combustion engine. The mixer includes an air horn, the relative position of which in relation to a shaped restriction body governs the air flow into the engine intake manifold. The flange of the air horn is configured to redirect the flow of air without generating significant turbulence, and providing a maximum velocity perpendicular flow to the injection of fuel to be mixed therein. The relative position of the air horn to the shaped restriction body is determined based on the cubic capacity and speed of the engine with which it is used.

20 Claims, 11 Drawing Sheets

GASEOUS FUEL AND AIR MIXER ASSEMBLY FOR INTERNAL COMBUSTION ENGINE

CROSS-REFERENCE TO RELATED PATENT APPLICATIONS

This patent application claims the benefit of U.S. Provisional Patent Application No. 60/423,170, filed Nov. 1, 2002.

FIELD OF THE INVENTION

The present invention relates generally to mixer valves for internal combustion engines, and more particularly to gas/air mixer assemblies for internal combustion engines that utilize gaseous fuel supplies.

BACKGROUND OF THE INVENTION

As is well understood in the art, internal combustion engines operate to convert the potential energy of a fuel source into useful power to perform a work function. Specifically, internal combustion engines operate by combusting a fuel to drive a piston to create motion to drive a load. To increase the efficiency of the combustion, internal combustion engines mix a quantity of fuel with air to enhance the combustibility thereof. Fuel metering valves are used to meter a proper amount of fuel into the combustion chamber. The control of the fuel metering valve may take into account various parameters including throttle position, the temperature and operating mode of the engine, the sensed emissions, etc. If the fuel/air mixture is too rich, i.e. contains too much fuel, the combustion in the chamber will not be complete, resulting in increased emissions. If the fuel/air mixture is too lean, i.e. not enough fuel for the volume of air, the engine performance will be decreased possibly resulting in stalling or damage to the engine.

While various mechanisms and complicated algorithms exist to control the proper metering of an amount of fuel to be combusted, little attention has been paid to the actual mixing of the metered fuel and air prior to combustion. Indeed, even in supercharged and turbocharged engine applications wherein the air supplied to the mixing chamber is pressurized, the actual mixing of the fuel and air is not typically controlled. That is, the metered amount of fuel and the air to be mixed are brought together in a manner that does not specifically control the proper mixing of these two inputs. As a result, the actual mixture of fuel and air may differ somewhat for each combustion cycle. As a result, the emissions from such an engine, and indeed its performance, may well vary. While such a situation occurs in internal combustion engines that utilize liquid fuels, the problem is particularly acute in internal combustion engines that utilize gaseous fuel, e.g. propane.

The reason this problem is of particular concern for gaseous fuel engines, besides the obvious decreased efficiency, increased cost, and increased environmental impact, is because such engines are typically used in closed environments such as factories. One such application used commonly in factories is the forklift. Since forklifts are used extensively in factories as well as in storage warehouses, home improvement stores, indoor lumberyards, etc., which may not have the best ventilation, any unnecessary increase in emissions is unacceptable.

In a typical gaseous fuel burning internal combustion engine, the gaseous fuel is supplied from a sealed tank through a gas regulator to a gaseous fuel metering valve. The gaseous fuel metering valve typically supplies an amount of the gaseous fuel to an engine manifold wherein it is mixed with a supply of air to form the combustible air fuel mixture that will be combusted in the internal combustion engine. While one might think that the mixture of a gaseous fuel such as propane and air would be a relatively simple matter resulting in a very homogenous air fuel mixture, the fact is that it is very difficult to achieve a homogenous air fuel mixture in the mixing chamber of the internal combustion engine prior to combustion. As a result, throttle response is affected and may be nonlinear or inconsistent. Further, and of great concern when used in enclosed spaces, the inconsistent nature of the gaseous fuel and air mixture results in inconsistent combustion and increased emissions.

Therefore, there exists a need in the art for a gas/air mixing device that will provide proper mixing of the gaseous fuel and air without adversely affecting throttle response, and which will alleviate the problem of increased emissions due to poor gaseous fuel/air mixture prior to combustion.

BRIEF SUMMARY OF THE INVENTION

In view of the above, it is an objective of the present invention to provide a new and improved gas/air mixing device that overcomes the above-described and other problems existing in the art. More particularly, it is an objective of the present invention to provide a new and useful gas/air mixing device having particular application to internal combustion engines that utilize gaseous fuel. Further, the gas/air mixing device of the present invention will preferably provide such increased benefits without moving parts in a particular application. Further, the mixing device of the present application may be easily adapted to different applications providing increased or decreased flow as required thereby.

In one embodiment of the present invention, the mixing device provides improved gas/air mixture without reducing throttle response by minimizing air turbulence at the point of gaseous fuel air mixing. Preferably, the mixing device of the present invention provides a Venturi-type mixing body configured to provide maximum velocity airflow in a direction perpendicular to the introduction of the gaseous fuel.

In one embodiment of the present invention, the mixing device includes a flow tube positionable in relation to a restriction body. The flow tube preferably includes a radiused semi-circular lip around which air may flow without substantial increased turbulence. Further, the flow tube preferably includes an upper flat forming, in relation to the mixing chamber body, a substantially laminar flow corridor through which the incoming air is drawn by the Venturi formed between the restriction body and the outward flared flow tube. The gaseous fuel discharge port is preferably located to provide gaseous fuel flow in a direction perpendicular to the substantially laminar airflow through this corridor. Preferably, the volume of air flow entering this chamber is controlled by a relative position between the flow tube and the restriction body, each of which have a profiled surface that vary the cross-sectional area as the two members are varied in relation to one another. However, once a particular engine application is selected, these two members are fixed in relation to one another such that proper mixing of the fuel and air may be maintained.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
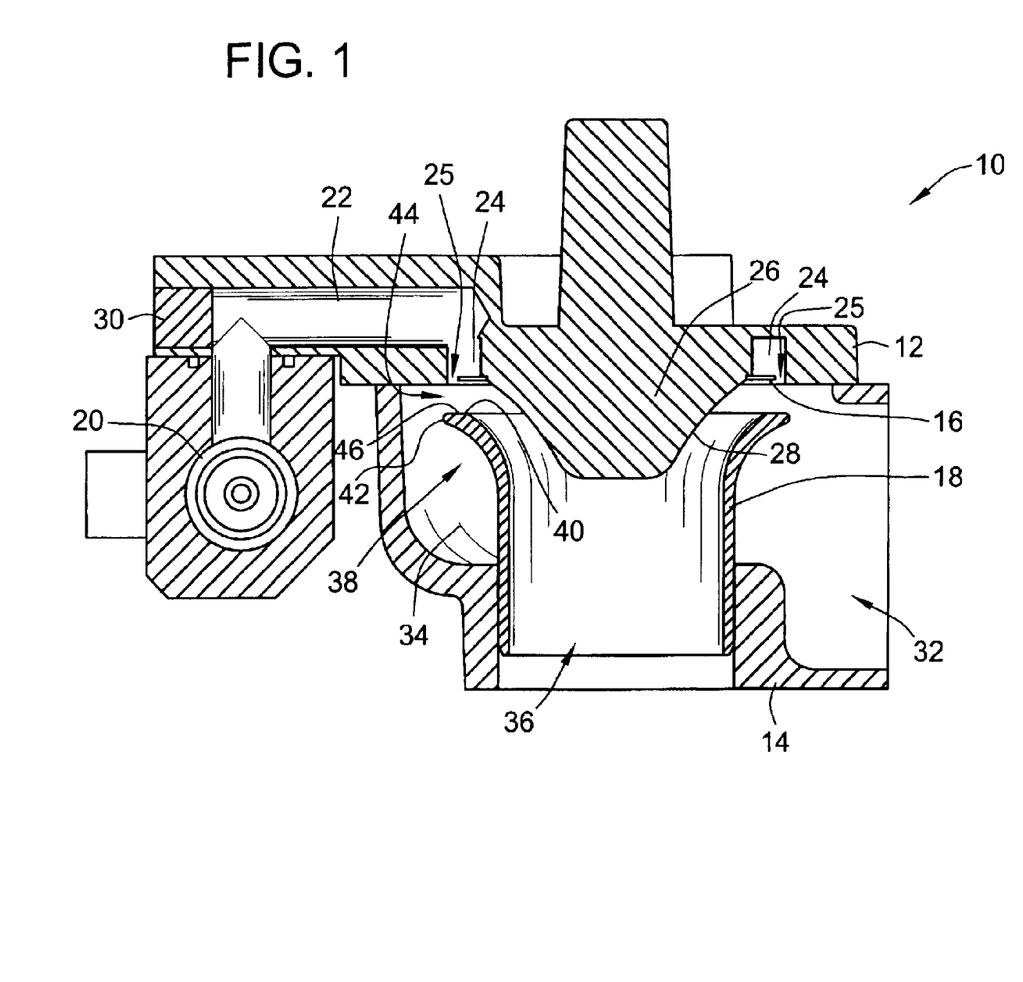
FIG. 1 is a cross-sectional illustration of an embodiment of the gaseous fuel and air mixer assembly including a gaseous fuel trim valve.

The mixer assembly of the present invention, an embodiment of which is illustrated in cross-section in FIG. 1, is particularly suited for applications requiring homogenous gas/air mixture such as internal combustion engines. This mixer has the unique capacity to be configured as a Venturi metering system and draw fuel from a zero governor, mix it with air to develop a homogenous air/fuel mixture for delivery to an internal combustion engine. It may also accept fuel under pressure from a gas metering valve or a fuel injector, and with the addition of a gasoline injector, may deliver fuel/air mixtures to a gasoline internal combustion engine. However, of particular applicability for the embodiment of the mixer assembly illustrated in FIG. 1, are internal combustion engines that utilize gaseous fuel. As discussed above, such engines are often employed to drive vehicles used in enclosed environments where the control of emissions is of particular importance. Such applications include, for example, propane powered forklifts. However, the mixer assembly of the present invention is in no way limited to such applications, and indeed provides homogenous gas/air mixtures for all varieties of engines and fuel types. Indeed, one significant advantage of the invention is that it may be easily configured to provide proper air/fuel mixture for a variety of fuels and engine types and sizes by simply adjusting the relative position of one part therein as will be discussed more fully below.

Turning now specifically to FIG. 1, an embodiment of a mixer assembly 10 includes a cover 12, a mixer body 14, a fuel spray plate 16, and an air horn 18. In the embodiment illustrated in FIG. 1, a fuel control trim valve 20 is also illustrated that serves to meter a required amount of fuel called for by the throttle to the engine. However, one skilled in the art will recognize that various types of fuel control valves may be utilized with the mixer assembly 10 depending on the application and fuel type used. The cover 12 includes a fuel delivery conduit 22 that delivers fuel from the fuel metering or trim valve 20 to a fuel discharge manifold 24 encircling a shaped restriction body 26. The shaped restriction body 26 is somewhat cone-shaped having a profiled conular surface 28. In one embodiment, the fuel delivery conduit 22 is machined into the cover 12, and therefore includes an end cap or plug 30 to seal the outward surface of the cover 12.

The mixing body 14 includes an air intake 32 leading to an internal air chamber 34. The mixer body 14 also includes an air/fuel discharge conduit 36 that provides the homogenous mixture of air and fuel to the intake manifold of the internal combustion engine.

As may be seen from this FIG. 1, the air horn 18 is inserted into the discharge conduit 36 of the mixer body 14, and extends into the air chamber 34. The height or distance that the air horn 18 extends into the air chamber 34 is governed by a relationship between the flared end 38 of the air horn 18 and the shaped restriction body 26 of the cover 12. Specifically, the height of the air horn 18 is determined to establish a given cross-sectional area between the inner surface 40 of the flared end 38 of air horn 18 and the conular external surface 28 of the shaped restriction body 26 of cover 12. This cross-sectional area is determined to provide the required air flow based primarily on cubic capacity and speed of the engine for which this mixing assembly 10 will be utilized. As the position of the air horn 18 is raised, the airflow volume will be reduced, and as the air horn 18 is lowered, the airflow volume will be increased. In a preferred embodiment, the air horn 18 is press fit into the discharge conduit 36 to the appropriate height. However, some applications may require or choose to secure the air horn 18 into the discharge conduit 36 by other methods including, but not limited to, spin, friction, or otherwise welding the air horn 18 into position, utilizing set or hex screws, etc.

Once the required cross-sectional area, and therefore the height of the air horn 18 has been determined, the mixer assembly 10 is assembled for operation. The relative positioning of the air horn 18 and the shaped restriction body 26 forms a Venturi which acts to draw air from the air chamber 34 into the discharge conduit 36. Of importance, as the air flows around the outermost edge 42 of the flared end 38 of air horn 18, its flow vector changes both in direction and magnitude as it accelerates to its maximum velocity through the air fuel mixing region or corridor 44 defined between the fuel discharge port 25 and the upper flat surface 46 of the flared end 38 of the air horn 18. Since an increase in turbulence negatively affects air flow, this outer surface 42 is radiused to provide a smooth flow path therearound to minimize the maximum extent possible the amount of turbulence generated in the vector redirection of the airflow through region 44.

Further, in this region 44, the upper flat surface 46 of air horn 18 provides airflow stability and ensures that the air flowing through region 44 at the point which the fuel is discharged is orthogonal to this fuel discharge. Without this flat surface 46, less than optimal air fuel mixing occurs. This proper mixing is also aided by the fuel discharge spray ring 16 which defines a continuous fuel discharge port 25 that ensures proper fuel delivery around the entire fuel discharge manifold 24 to take maximum advantage of the Venturi metering provided by the air horn 18 and the shaped restriction body 26. This continuous fuel discharge port 25 is formed between the inside diameter of the fuel discharge manifold 24 outer wall and the outer diameter of the fuel spray plate 16. Particularly, the fuel delivery port 25 formed by the spray ring 16 is positioned to be directly above the flat surface 46 of air horn 18. In this way, the mixing apparatus of the present invention ensures that the flow vectors of the gaseous fuel and the air are orthogonal to one another, with the air vector being at its maximum magnitude at the point of entry of the fuel. This approximately laminar flow in region 44 is aided greatly by the semicircular radiused end 42 of the flared portion 38 of air horn 18.

Figure 2:
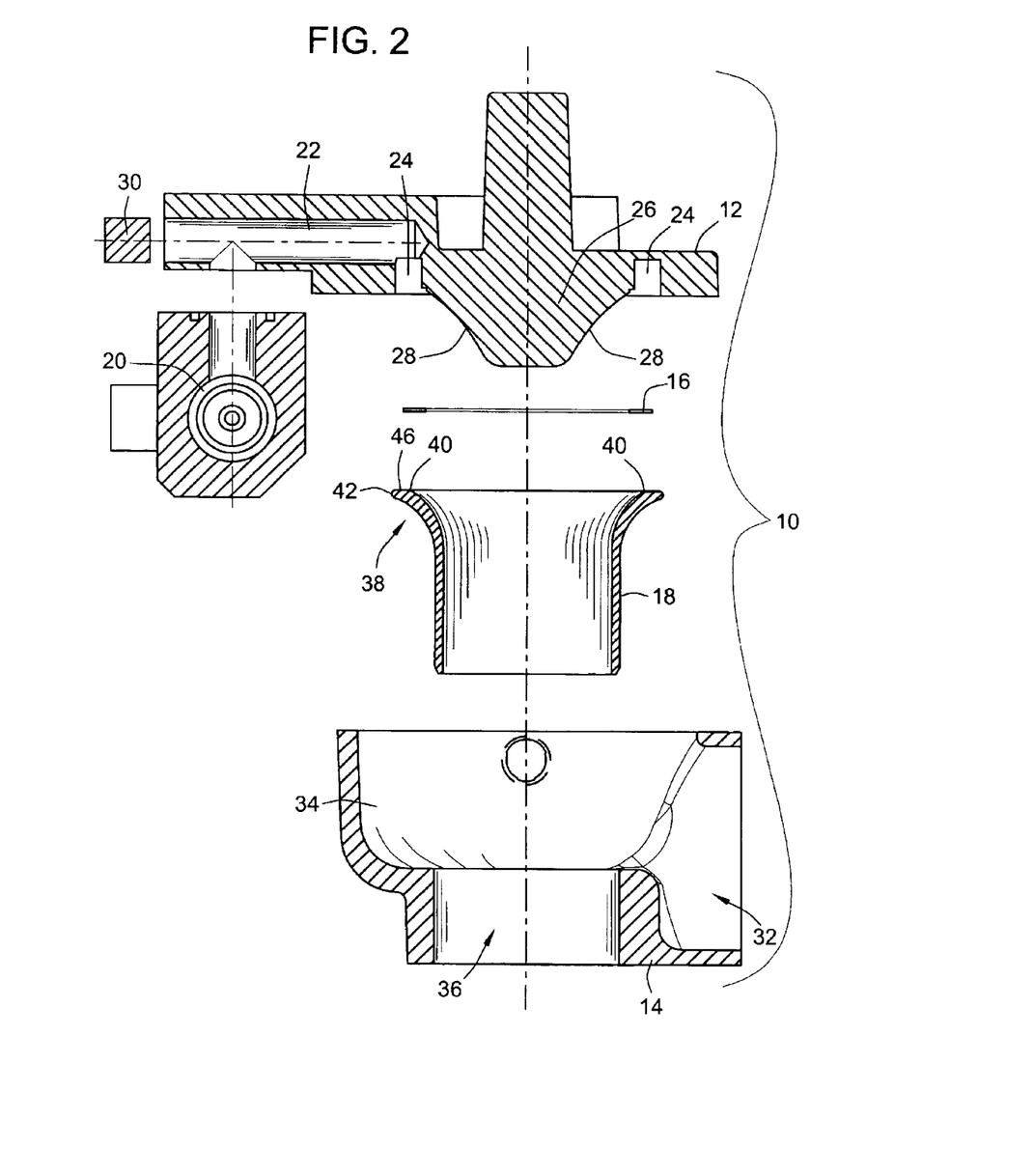
FIG. 2 is an exploded cross-sectional illustration of the embodiment of the present invention illustrated in FIG. 1.
Figure 3:
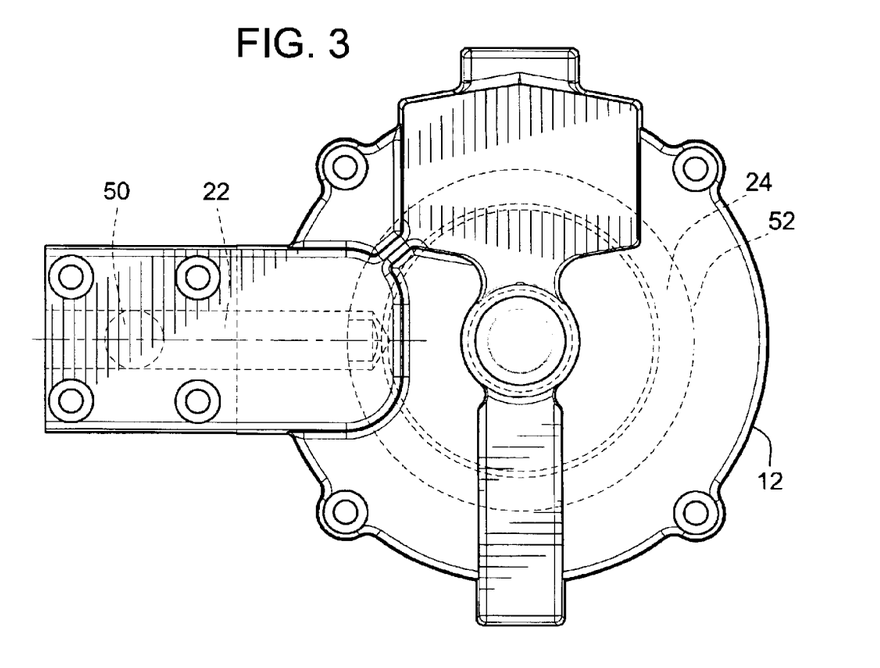
FIG. 3 is a top view illustration of the cover of the mixer assembly illustrated in FIG. 1.

Having described the assembly and operation of the mixer assembly of the present invention, attention will now be directed to the individual components of this assembly as shown in exploded cross section in FIG. 2. Turning first to the mixer cover 12, reference will be made to FIGS. 3–6. As may be seen in the top view illustration of FIG. 3, the cover 12 includes the fuel delivery conduit 22 provided through a gas flow portion 54 of cover 12. The gas is delivered to the fuel delivery conduit 22 via a gas delivery port 50. As may be seen from this top view illustration, the fuel discharge manifold 24 receives gaseous fuel from the fuel delivery conduit 22 and provides 360° delivery of that gaseous fuel. To ensure delivery of the gaseous fuel around the entire fuel discharge manifold 24, the fuel spray ring 16 is fitted into recess 52.

Figure 4:
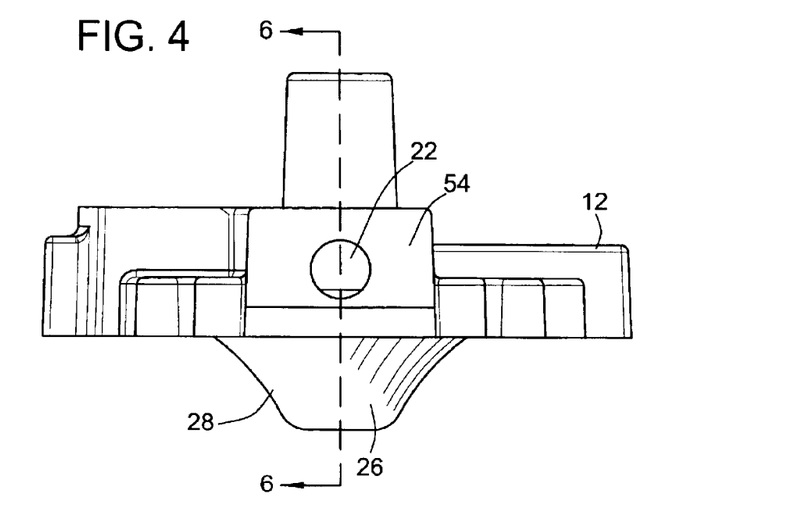
FIG. 4 is a side view illustration of the cover of FIG. 3.
Figure 5:
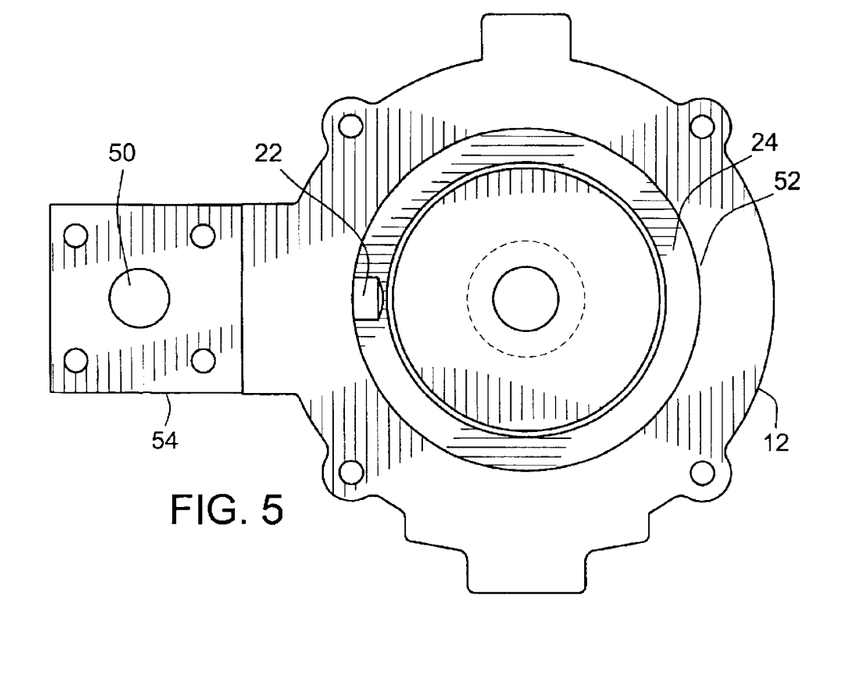
FIG. 5 is a bottom view illustration of the cover of FIG. 3.
Figure 6:
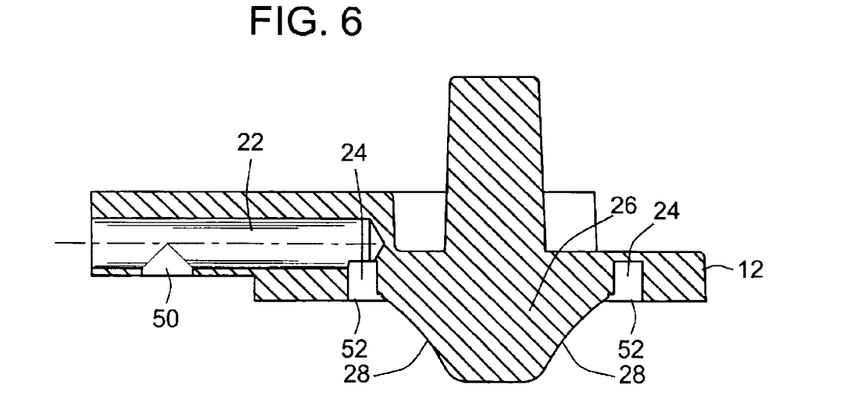
FIG. 6 is a cross-sectional view taken along section 6—6 of the cover of FIG. 4.

As may be seen from the left side illustration of cover 12 in FIG. 4, the shaped restriction body 26 includes a conular outer surface 28 as discussed above. As may also be seen from this side illustration of FIG. 4, the fuel delivery conduit 22 is open as a result of the manufacturing process of this embodiment of the present invention wherein the conduit 22 is formed by machining the cover 12. However, as discussed above, a plug or other seal 30 closes this conduit 22 so that the flow of gaseous fuel is only delivered to the interior of the mixer assembly. The fuel delivery port 50 and the discharge of the fuel delivery conduit 22 into the fuel discharge manifold 24 may be seen in the bottom view illustration of FIG. 5. The recess 52 into which the fuel spray ring 16 is fit may also be seen in this bottom view illustration of cover 12. Each of these features may be seen more clearly in the cross-section of FIG. 6, which is taken along section line 6—6 of FIG. 4.

Figure 7:
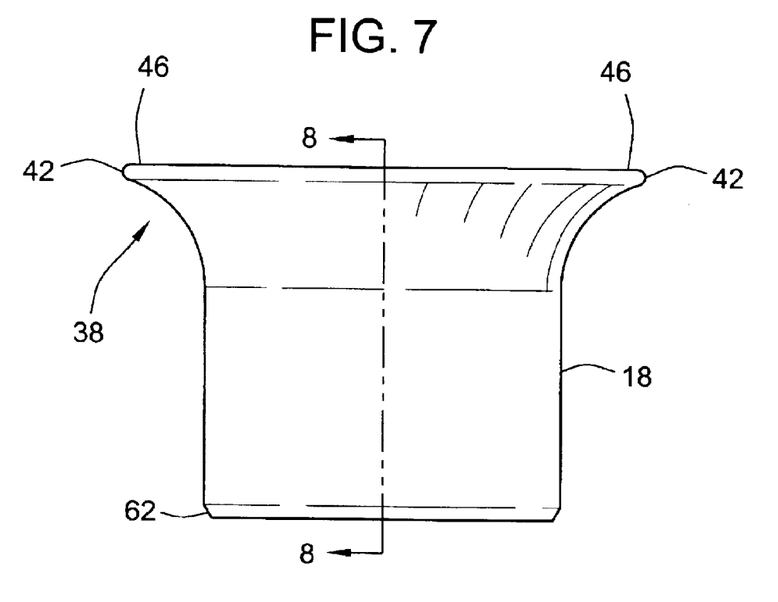
FIG. 7 is a side view illustration of the flow tube or air horn employed in the embodiment of the mixer assembly illustrated in FIG. 1.
Figure 8:
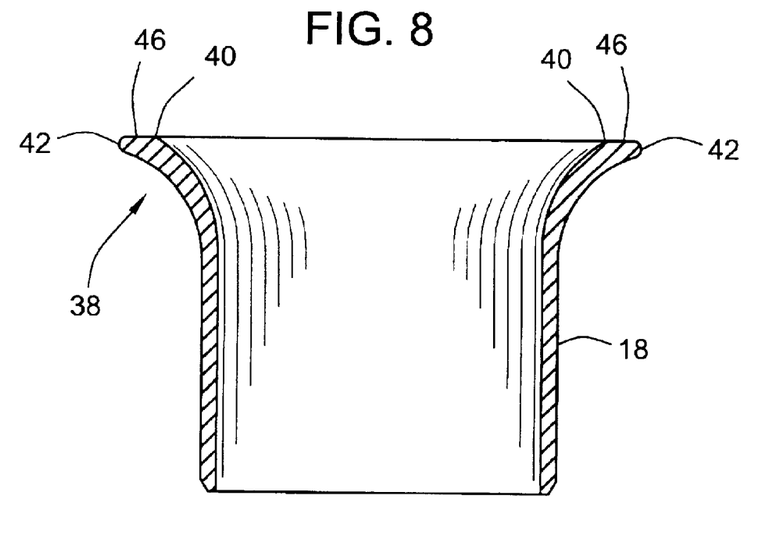
FIG. 8 is a cross-sectional illustration taken along section 8—8 of the air horn of FIG. 7.
Figure 9:
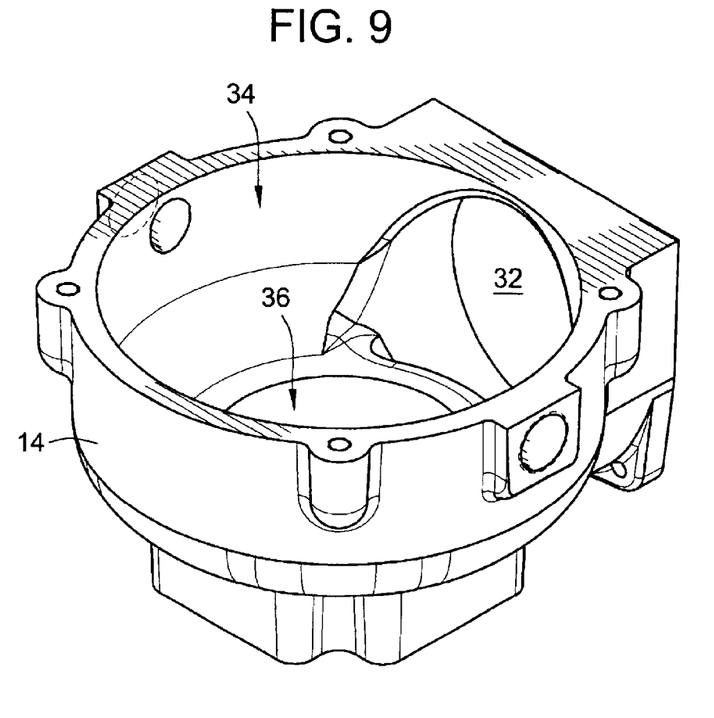
FIG. 9 is an isometric illustration of the mixer body of the embodiment of the mixer assembly of the present invention illustrated in FIG. 1.
Figure 10:
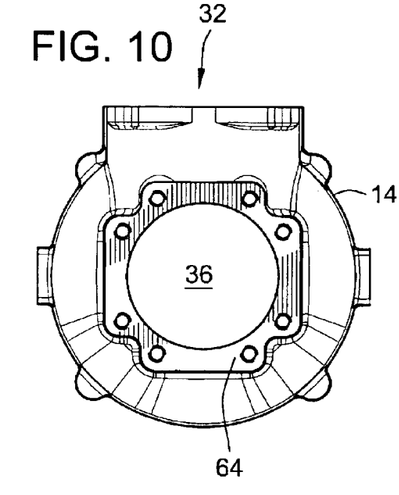
FIG. 10 is a bottom view illustration of the mixer body of FIG. 9.
Figure 11:
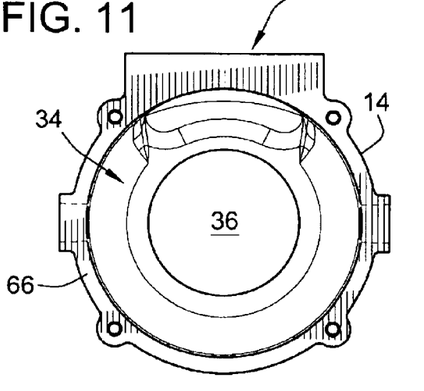
FIG. 11 is a top view illustration of the mixer body of FIG. 9.

FIGS. 7 and 8 illustrate the air horn of the present invention. As may be seen from FIG. 7, the air horn 18 includes a flared portion 38 that terminates at a semi-circular radiused edge 42. The top surface 46 of the air horn 18 defines a flat surface that may more readily be seen in the cross-section of FIG. 8. The innermost termination of the flat section 46 designated by numeral 40 defines, in relation to the shaped restriction body 26 of cover 12 the area through which the air/fuel mixture flows. In one embodiment of the present invention, the air horn 18 also includes a narrowed outer wall portion 62 that aids in the insertion of the air horn 18 into the discharge conduit 36 during assembly.

Figure 12:
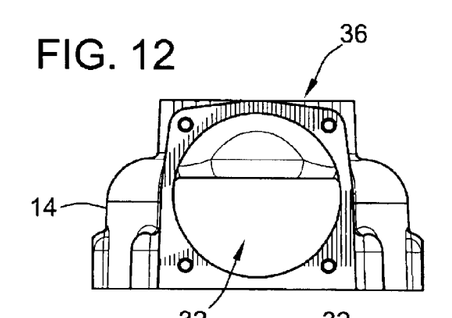
FIG. 12 is a back view illustration of the mixer body of FIG. 9.
Figure 13:
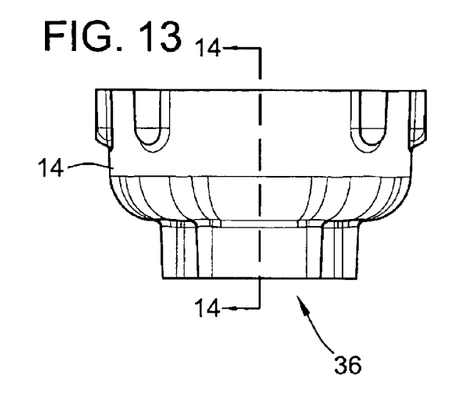
FIG. 13 is a front view illustration of the mixer body of FIG. 9.
Figure 14:
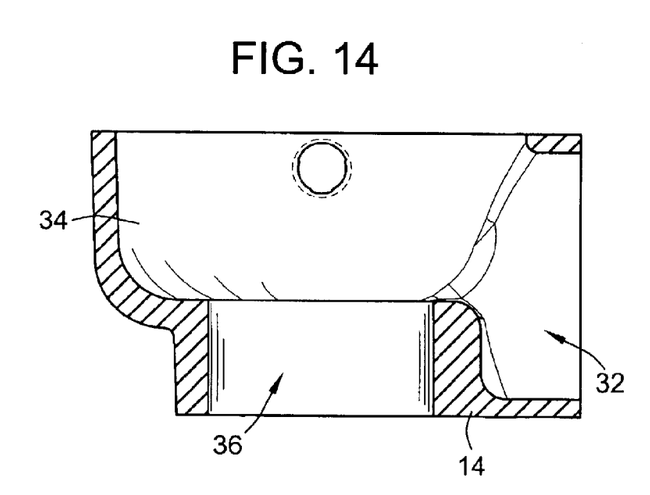
FIG. 14 is a cross-sectional view taken along section 14—14 of the mixer body of FIG. 13.

Referring now to FIGS. 9–14, the mixer body 14 is illustrated in greater detail. In the isometric illustration of FIG. 9, the air intake 32 and discharge conduit 36, which are coupled through the mixing chamber 34 may plainly be seen. Indeed, the smooth cup-shaped mixing chamber 34 provides excellent airflow therein without square or sharp edges to increase turbulence and decrease airflow. In the bottom view illustration of FIG. 10, the mounting land 64 for this embodiment of the mixer body 14 is illustrated. However, one skilled in the art will recognize that this mounting land 64 may take various forms depending upon the particular application for the mixer assembly 10. In the top view illustration of FIG. 11, the entrance of the air inlet 32 into the mixing chamber 34 is illustrated, as is the mounting surface 66 that mates with the cover 12 in the assembled mixer assembly 10. FIGS. 12 and 13 illustrate the back and front side illustrations of the mixer body 14. FIG. 14 illustrates a cross-section of the mixer body 14 taken along the section line 14—14 of FIG. 13. As illustrated in this cross-section, the transition between the air inlet 32 and the mixing chamber 34 is accomplished across curved transitional surfaces that ensure smooth air flow into the mixing chamber 34 so as to not adversely affect the overall airflow of the mixer assembly.

Figure 15:
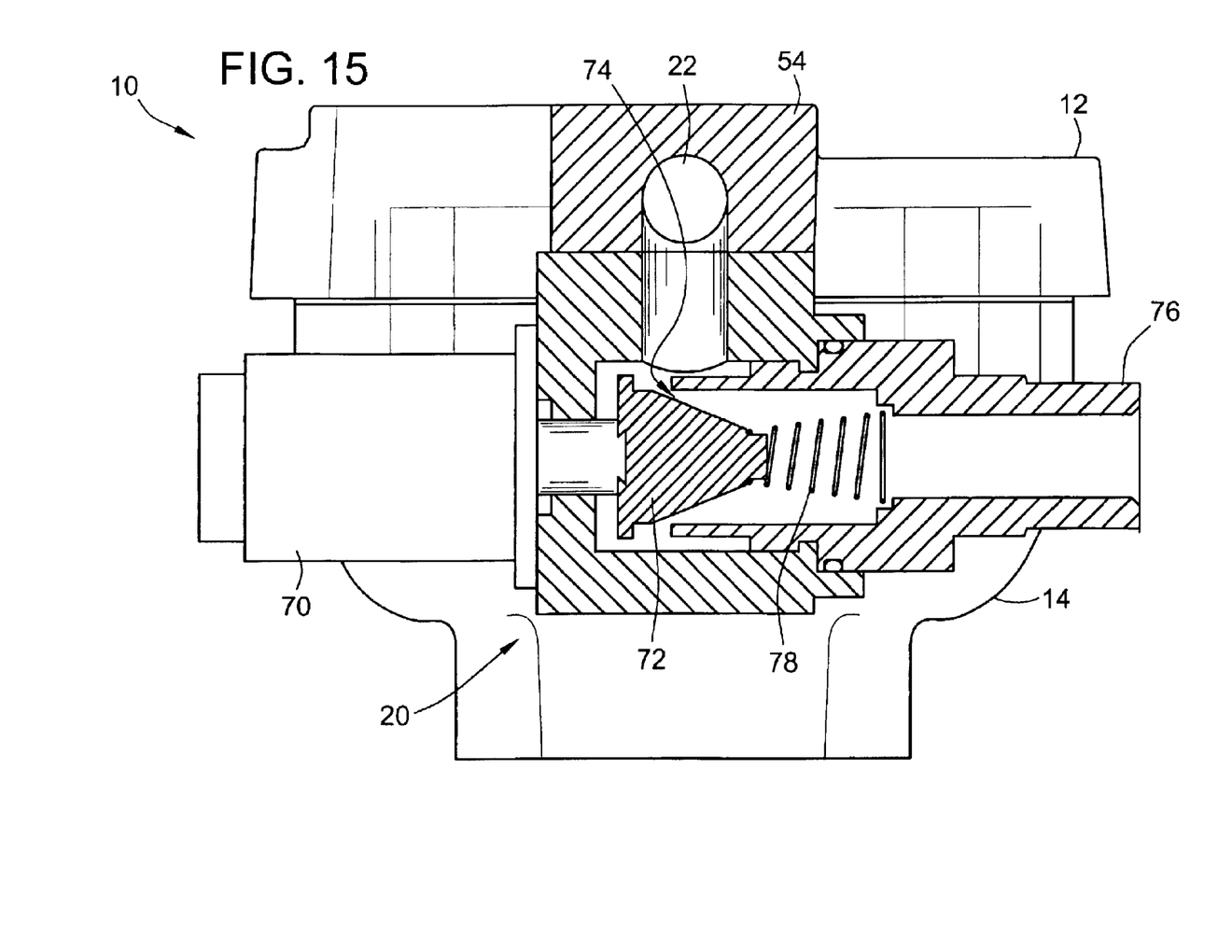
FIG. 15 illustrates one embodiment of the mixer assembly of the present invention utilizing a gaseous fuel trim valve.

FIG. 15 illustrates an embodiment of the mixer assembly 10 of the present invention utilizing a particular type of gaseous fuel trim valve 20. To provide an orientation for the illustration of FIG. 15, it is a left side view partial cutaway illustration of the mixer assembly 10 illustrated in FIG. 1. As may be seen from this FIG. 15, the gaseous fuel trim valve 20 includes a control solenoid 70 that controls the lateral position of a multi-angled conical plunger 72 to control the size of the opening 74 between the end of the fuel supply conduit 76 and the shaped plunger 72. As the control solenoid 70 retracts the plunger 72 the opening 74 is increased, which meters a greater amount of fuel to be delivered to the engine in response to a demand for increased power. To reduce the amount of fuel delivered to the engine, the control solenoid 70 extends the plunger 72 deeper into the fuel supply conduit 76 to reduce the size of the opening 74.

To provide fail safe operation, a biasing means such a spring 78 is provided within the fuel supply conduit 76. This spring 78 acts to push the plunger 72 a predetermined distance to fix the opening 74 at a known position which will continue to allow operation of the engine in a safe manner. This spring 78 will also act to pull the plunger 72 back into this predetermined position if the control solenoid 70 had previously retracted the plunger 72 to a wider open position before failure occurred. As such, the engine may be operated in a known manner that will provide safe operation upon failure of the fuel metering device 20.

Figure 16:
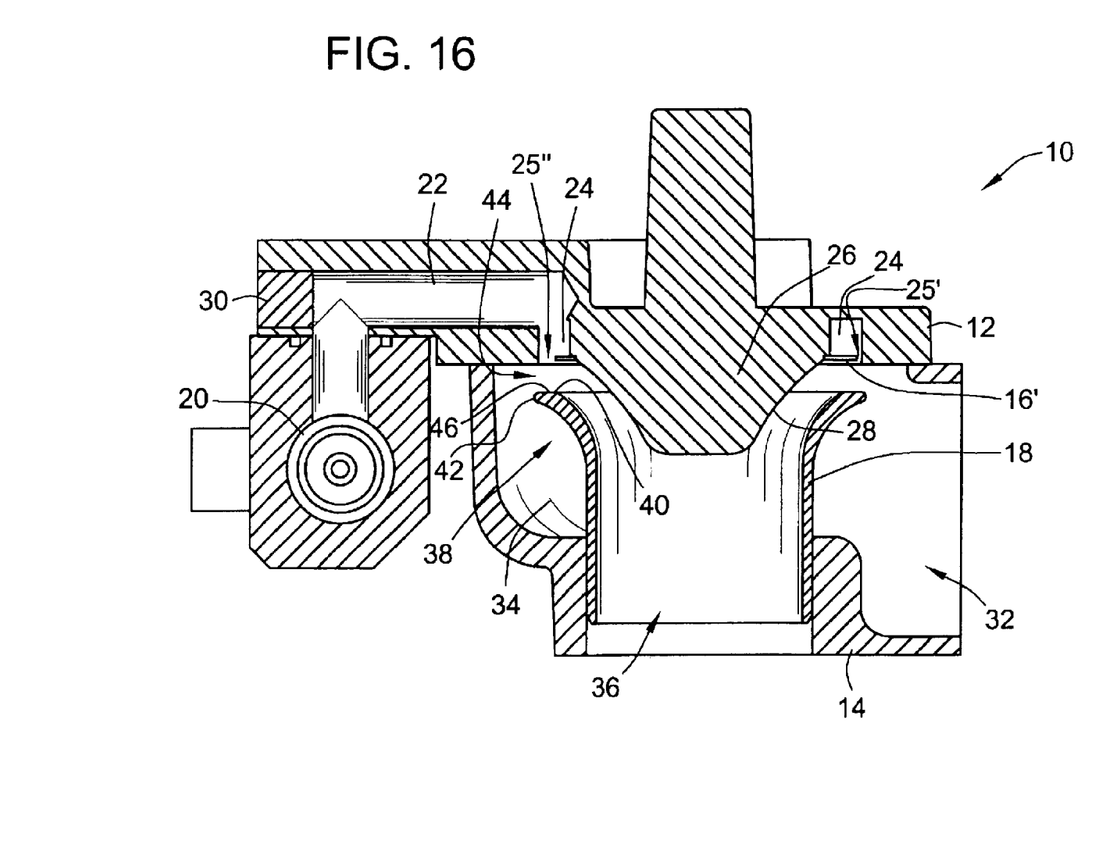
FIG. 16 is a cross-sectional illustration of an alternate embodiment of the gaseous fuel and air mixer assembly including a gaseous fuel trim valve.

FIG. 16 illustrates an alternate embodiment of the gaseous fuel and air mixer assembly of the present invention. Specifically, in this embodiment of the present invention, the fuel spray plate 16' has an eccentric outer diameter. This eccentric outer diameter in association with the inner diameter of the outer wall of the manifold 24, forms a fuel discharge port that varies in size around the periphery. Preferably, the fuel discharge plate 16' is positioned such that the fuel discharge port 25' near the air inlet conduit 32 is narrower than the fuel discharge port 25" near the fuel inlet in proximity to conduit 22. While this provides enhanced air and fuel mixing in the embodiment illustrated in FIG. 16, other embodiments of the mixing assembly may experience increased efficiencies through a variation in the placement of the eccentric fuel plate 16.

Figure 17:
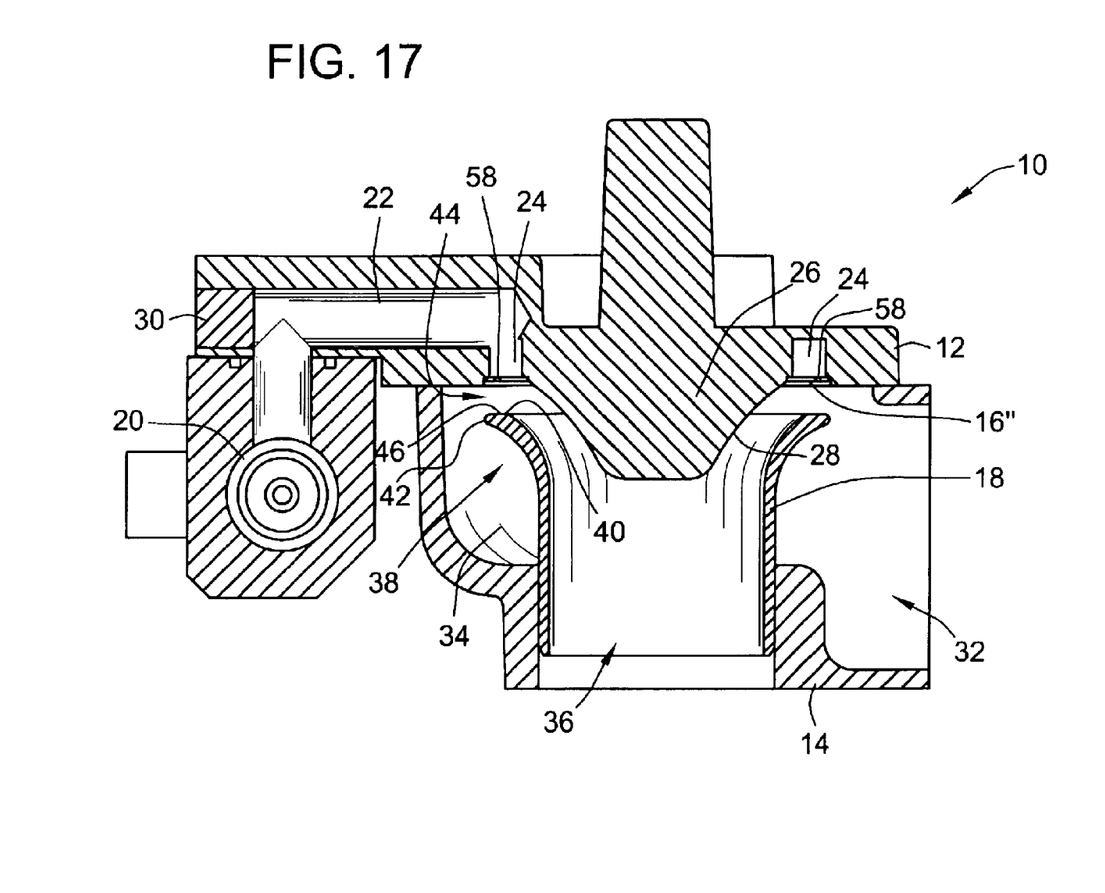
FIG. 17 is a cross-sectional illustration of a further alternate embodiment of the gaseous fuel and air mixer assembly including a gaseous fuel trim valve.

A further alternate embodiment of the mixing assembly of the present invention is illustrated in cross-sectional view in FIG. 17. As may be seen from this alternate embodiment, the fuel plate 16″ includes a plurality of discharge ports 58. These discharge ports 58 are positioned in line with the upper flat surface 46 of air horn 18. This relative positioning ensures that proper fuel delivery around the entire fuel discharge manifold 24 will take maximum advantage of the Venturi metering provided by the air horn 18 and the shaped restriction body 26.

Figure 18:
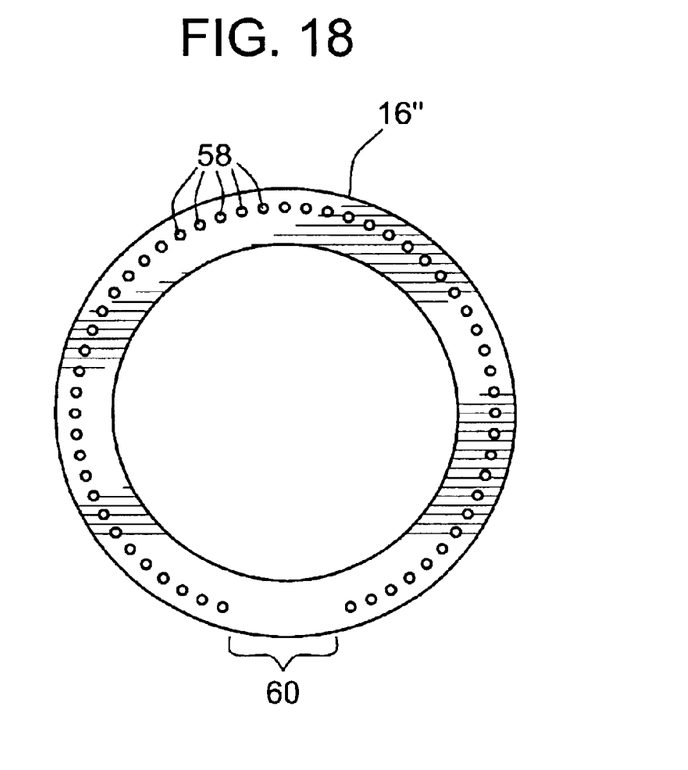
FIG. 18 is a top view illustration of an alternate embodiment of a fuel plate that may be employed in an embodiment of the present invention.

Referring now to FIG. 18, an alternate embodiment of the fuel spray ring 16″ is illustrated in top view. This spray ring 16″ includes a plurality of fuel delivery ports 58 through which the flow of fuel is provided. The spray ring 16″ also includes a region 60 that is void of fuel delivery ports 58. As assembled in the mixer 10 of the present invention, this region 60 is positioned in proximity to the junction between the fuel delivery conduit 22 and the fuel discharge manifold 24. In this way, the flow of fuel from the fuel delivery conduit 22 is forced to flow around the fuel discharge manifold 24 more evenly than if there were fuel delivery ports directly below this junction. This helps to ensure that the fuel delivered through each of the individual fuel delivery ports 58 will be approximately uniform. Indeed, this feature may be incorporated in the other embodiments discussed above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A fuel and air mixer assembly, comprising:
   a mixer body forming an internal air chamber therein, the mixer body further defining an air intake and an air/fuel discharge conduit in communication with the internal air chamber;
   an air horn positioned in the air/fuel discharge conduit, the air horn having a flared end extending into the internal air chamber, the flared end of the air horn having an upper flat surface;
   a cover positioned on the mixer body, the cover having a shaped restriction body extending therefrom into the flared end of the air horn, the cover further defining a fuel discharge manifold therein; and
   a fuel spray plate positioned at an outlet of the fuel discharge manifold and defining a fuel discharge port thereat, the fuel discharge port being positioned in orthogonal alignment with the upper flat surface of the air horn, the fuel spray plate and the upper flat surface forming an air flow through region therebetween.

2. The assembly of claim 1, wherein the fuel spray plate has an outer diameter that is smaller than an inner diameter of an outer wall of the fuel discharge manifold thereby forming a single fuel discharge port around a periphery thereof.

3. The assembly of claim 1, wherein the fuel spray plate has an eccentric outer diameter that is smaller than an inner diameter of an outer wall of the fuel discharge manifold thereby forming a single fuel discharge port of varying width around a periphery thereof.

4. The assembly of claim 1, wherein the fuel discharge port is formed by a plurality of fuel delivery ports defined in the fuel spray plate.

5. The assembly of claim 1, wherein the fuel spray plate includes a region void of a fuel discharge port.

6. The assembly of claim 5, wherein the cover defines a fuel delivery conduit therein, the fuel delivery conduit coming into communication with the fuel discharge manifold at a first location, and wherein the region void of a fuel discharge port is located in alignment with the first location.

7. The assembly of claim 1, wherein the flared end of the air horn includes an outer surface that is radiused to provide a smooth flow path therearound to minimize turbulence generated in a vector redirection of airflow through the air flow through region.

8. The assembly of claim 1, wherein a position of the air horn may be varied to vary an amount by which the air horn extends into the internal air chamber, thereby varying a cross-sectional area of the air flow through region.

9. The assembly of claim 1, wherein the fuel spray plate, shaped restriction body, and the upper flat surface of the air horn form a Venturi.

10. A gaseous fuel and air mixer assembly for use in an internal combustion engine, comprising:
    a mixer housing having an air inlet and a fuel/air outlet, the mixer housing forming an internal air chamber therein;
    an air horn extending into the internal air chamber from the fuel/air outlet, the air horn having a flared end having a radiused outer surface to reduce turbulence generated in a vector redirection of air flowing from the internal air chamber to the fuel/air outlet, the air horn further defining an upper flat surface;

a cover having a conular restriction body extending therefrom into the flared end of the air horn forming a Venturi, the cover further including a fuel discharge port orthogonally positioned relative to the upper flat surface in the Venturi.

11. The assembly of claim 10, wherein the fuel discharge port is formed by a fuel spray plate positioned in a fuel discharge manifold defined in the cover.

12. The assembly of claim 11, wherein the fuel spray plate has an outer diameter that is smaller than an inner diameter of an outer wall of the fuel discharge manifold thereby forming a continuous fuel discharge port around a majority of a periphery thereof.

13. The assembly of claim 11, wherein the fuel spray plate has an eccentric outer diameter that is smaller than an inner diameter of an outer wall of the fuel discharge manifold thereby forming a continuous fuel discharge port of varying width around a periphery thereof.

14. The assembly of claim 13, wherein the cover further defines a fuel delivery conduit therein in communication with the fuel discharge manifold, and wherein a first width of the fuel discharge port at a first position in proximity to a union of the fuel delivery conduit and the fuel discharge manifold is wider than a second width of the fuel discharge port at a second position in proximity to the air inlet.

15. The assembly of claim 11, wherein the fuel discharge port is formed by a plurality of fuel delivery ports defined in the fuel spray plate.

16. The assembly of claim 11, wherein the fuel spray plate includes a region void of a fuel discharge port.

17. The assembly of claim 10, wherein the radiused outer surface and the upper flat surface are configured to provide essentially non-turbulent air flow through the Venturi in a direction orthogonal to the fuel discharge port to enhance mixing of air and fuel in the assembly.

18. The assembly of claim 17, wherein a position of the air horn in the internal air chamber relative to the conular restriction body is variable.

19. The assembly of claim 10, wherein the cover further defines a fuel delivery conduit therein in communication with a fuel discharge manifold.

20. The assembly of claim 18, wherein the fuel delivery conduit is closed at an end opposite the fuel discharge manifold by an end cap.

* * * * *